US009733823B2

(12) United States Patent
Rosnow et al.

(10) Patent No.: US 9,733,823 B2
(45) Date of Patent: Aug. 15, 2017

(54) VIEW ACTIVATION VIA HIT TESTING IN AN ASYNCHRONOUS WINDOWING SYSTEM

(71) Applicant: Microsoft Technology Licensing, LLC., Redmond, WA (US)

(72) Inventors: Harley M. Rosnow, Kirkland, WA (US); Albert Hwang, Seattle, WA (US); Ramrajprabu Balasubramanian, Sammamish, WA (US); Baris Yazici, Sammamish, WA (US); Peter Freiling, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 321 days.

(21) Appl. No.: 14/676,606

(22) Filed: Apr. 1, 2015

(65) Prior Publication Data

US 2016/0291828 A1  Oct. 6, 2016

(51) Int. Cl.
| | | |
|---|---|---|
| *G06F 3/048* | (2013.01) | |
| *G06F 3/0488* | (2013.01) | |
| *G06F 3/0484* | (2013.01) | |
| *G06F 3/0481* | (2013.01) | |

(52) U.S. Cl.
CPC .......... *G06F 3/0488* (2013.01); *G06F 3/0481* (2013.01); *G06F 3/04842* (2013.01)

(58) Field of Classification Search
CPC .................................................... G06F 3/0488
USPC ........................................................ 715/835
See application file for complete search history.

(56) References Cited

U.S. PATENT DOCUMENTS

| | | |
|---|---|---|
| 6,295,055 B1 | 9/2001 | Miller et al. |
| 6,359,572 B1 | 3/2002 | Vale |
| 6,741,267 B1 | 5/2004 | Leperen |
| 6,954,218 B2 | 10/2005 | Stall |
| 8,031,190 B2 | 10/2011 | Smith et al. |
| 8,345,045 B2 | 1/2013 | Schechter et al. |
| 8,793,611 B2 | 7/2014 | van Os |
| 9,342,497 B1* | 5/2016 | Waite ................... G06F 17/246 |
| 2003/0210270 A1 | 11/2003 | Clow et al. |
| 2004/0172616 A1* | 9/2004 | Rothschiller ....... G06F 17/2247 717/114 |
| 2005/0088447 A1* | 4/2005 | Hanggie ............... G06F 3/0481 345/545 |
| 2005/0179684 A1* | 8/2005 | Wallace ................ G06T 11/206 345/419 |
| 2006/0112349 A1 | 5/2006 | Clow et al. |

(Continued)

FOREIGN PATENT DOCUMENTS

| | | |
|---|---|---|
| CA | 2428814 A1 | 9/2004 |
| EP | 0247827 A2 | 12/1987 |
| WO | 2005045584 A2 | 5/2005 |

OTHER PUBLICATIONS

European Patent Office, "International Search Report" and "Written Opinion" issued in PCT Application No. PCT/US2016/024404, Mailed Date: Jul. 20, 2016, 13 Pages.
"Hit-Testing in iOS", Published on: Apr. 22, 2014 Available at: http://smnh.me/hit-testing-in-ios/ , (11 pages).
Apple Inc., "Multitouch Events", Published on: Jun. 6, 2013 Available at: https://developer.apple.com/library/ios/documentation/EventHandling/Conceptual/EventHandlingiPhoneOS/multitouch_background/multitouch_background.html , (17 pages).

(Continued)

*Primary Examiner* — William Titcomb
(74) *Attorney, Agent, or Firm* — Fogarty LLP (57) ABSTRACT

Embodiments provide systems and methods for activating applications in a distributed asynchronous system based on detecting touches on a display.

19 Claims, 5 Drawing Sheets

(56) References Cited

U.S. PATENT DOCUMENTS

| | | | |
|---|---|---|---|
| 2011/0138319 A1* | 6/2011 | Sidman | G06F 3/0481 |
| | | | 715/781 |
| 2012/0011437 A1 | 1/2012 | James et al. | |
| 2012/0056819 A1 | 3/2012 | Peterson et al. | |
| 2012/0240060 A1* | 9/2012 | Pennington | G06F 1/1618 |
| | | | 715/753 |
| 2013/0179904 A1 | 7/2013 | Brun | |
| 2014/0013160 A1 | 1/2014 | Rakow et al. | |
| 2014/0019844 A1 | 1/2014 | Rakow et al. | |
| 2014/0181934 A1* | 6/2014 | Mayblum | H04L 63/10 |
| | | | 726/7 |
| 2015/0067596 A1* | 3/2015 | Brown | G06F 3/0416 |
| | | | 715/808 |
| 2015/0067602 A1* | 3/2015 | Bernstein | G06F 3/0488 |
| | | | 715/823 |
| 2016/0224194 A1* | 8/2016 | Pacalin | G06F 3/0481 |

OTHER PUBLICATIONS

Microsoft Corporation, "Hit Testing in the Visual Laye", Published on: Feb. 11, 2012 Available at: https://msdn.microsoft.com/en-us/library/ms752097(v=vs.110).aspx, (4 pages).

Microsoft Corporation, "Events and Routed Events Overview", Published on: Sep. 7, 2014 Available at: https://msdn.microsoft.com/en-us/library/hh758286.aspx, (5 pages).

"Second Written Opinion Received for PCT Application No. PCT/US2016/024404", Mailed Date: Feb. 16, 2017, 8 Pages.

"International Preliminary Report on Patentability Issued in PCT Application No. PCT/US2016/024404", dated Jun. 1, 2017, 9 Pages.

* cited by examiner

VIEW ACTIVATION VIA HIT TESTING IN AN ASYNCHRONOUS WINDOWING SYSTEM

BACKGROUND

Many devices, such as computers, tablets, smartphones, and gaming systems, allow users to touch or "click" on displayed objects in order to select an option or identify where additional input, such as keystrokes, should be entered. For example, the user may touch the display with his or her finger or use a pointer input, such as a mouse click or pen tap, to identify an area of interest on the display. A device may use hit testing to determine what area of the display has been selected and then perform additional operations based upon the object displayed in the selected area. For example, when the user has selected an input field (e.g., a text input field) on an application's display, the application is notified that additional input, such as a keyboard input, is associated with the selected input field. In a synchronous operating system, a central component performs this hit testing and determines what portion of a display has been selected.

In systems that allow for the simultaneous display of multiple application windows, the hit testing may determine not only what area has been selected, but may also determine which of two or more displayed applications is associated with the selected area. For example, different applications may be displayed in different windows with one of the windows being associated with a currently active application. The central component in a synchronous system receives all inputs and has knowledge about all displayed windows. This allows the user's pointer input to be easily be correlated with a target window so that non-active or non-selected windows can be activated when touched before additional input (e.g., keystrokes) are provided to the selected application.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, an asynchronous windowing system comprises a display, a processor; and system memory storing computer-executable instructions that, when executed by the processor, cause the processor to provide view activation via hit testing. The system detects an input on a display. The input on the display may be, for example, from a human touch or a pointing device.

An input state manager in the system then executes hit-testing on a visual tree to identify a selected view using the input on the display. The selected view is then compared to an active view. A shell in the system is notified when the selected view does not match the active view. The input state manager is then notified whether or not the shell has determined the selected view should be made a new active view.

The system may further instruct an application activation service to activate an application associated with the selected view. An input state manager is notified when the application associated with the selected view has been made an active view.

The system stores keyboard input when the selected view does not match the active view. The stored keyboard input is then routed to the application associated with the selected view when the selected view has been made an active view.

The shell may apply view policies to determine when the selected view should be made a new active view.

The system may further determine when the shell has declined to set the selected view as the new active view. Based on past declined views, the system may determine whether to notify the shell when a subsequent selection of the selected view does not match the active view.

In another embodiment, a method for activating views on a display, comprises detecting an input on the display, hit testing on a visual tree to identify a top-level visual for a selected view using the input on the display, comparing the selected view to an active view, notifying a shell when the selected view does not match the active view, and notifying an input state manager whether or not the shell has determined that the selected view should be made a new active view. The shell may apply view policies to determine when the selected view should be made a new active view.

The method may further comprise instructing an application activation service to activate an application associated with the selected view, and notifying an input state manager when the application associated with the selected view has been made an active view.

In further embodiments, the method further comprises storing keyboard input when the selected view does not match the active view, and routing stored keyboard input to the application associated with the selected view when the selected view has been made an active view.

The method may further comprise determining when the input state manager has declined to set the selected view as the new active view, and evaluating whether to notify the shell when a subsequent selection of the selected view does not match the active view.

In a further embodiment, a method comprises displaying an active application view and at least one inactive application view on a display, hit-testing a touch on the display to identify a selected application, notifying a shell component when the selected application is not the active application, and queuing keyboard input when the selected application is not the active application.

The method may further comprise providing the queued keyboard input to the selected application after receiving notification that activation of the selected application is complete or to a previously active application after receiving notification that activation of the selected application is declined.

The method may further comprise evaluating, by the shell component, whether to make the selected application a new active application.

The method may further comprise receiving a notification, from the view management component, that the selected application is being made a new active application, and comparing applications identified in subsequent hit testing to the new active application.

The method may further comprise receiving a notification, from the shell or a view management component, that the selected application is not being made a new active application, and storing the selected application to a list of declined applications. It is advantageous to report the decision on which view is active as soon as possible to minimize the time keyboard input is queued. The method may then perform hit-testing on a second touch on the display to identify a second selected application, determine that the second selected application is not the active application, and determine whether to notify the view management component when the second selected application is not the active application based upon the list of declined applications.

DRAWINGS

To further clarify the above and other advantages and features of embodiments, a more particular description of embodiments will be rendered by reference to the appended drawings. It is appreciated that these drawings depict only typical embodiments and are therefore not to be considered limiting of its scope. The invention will be described and explained with additional specificity and detail through the use of the accompanying drawings in which.

DETAILED DESCRIPTION

Figure 1:
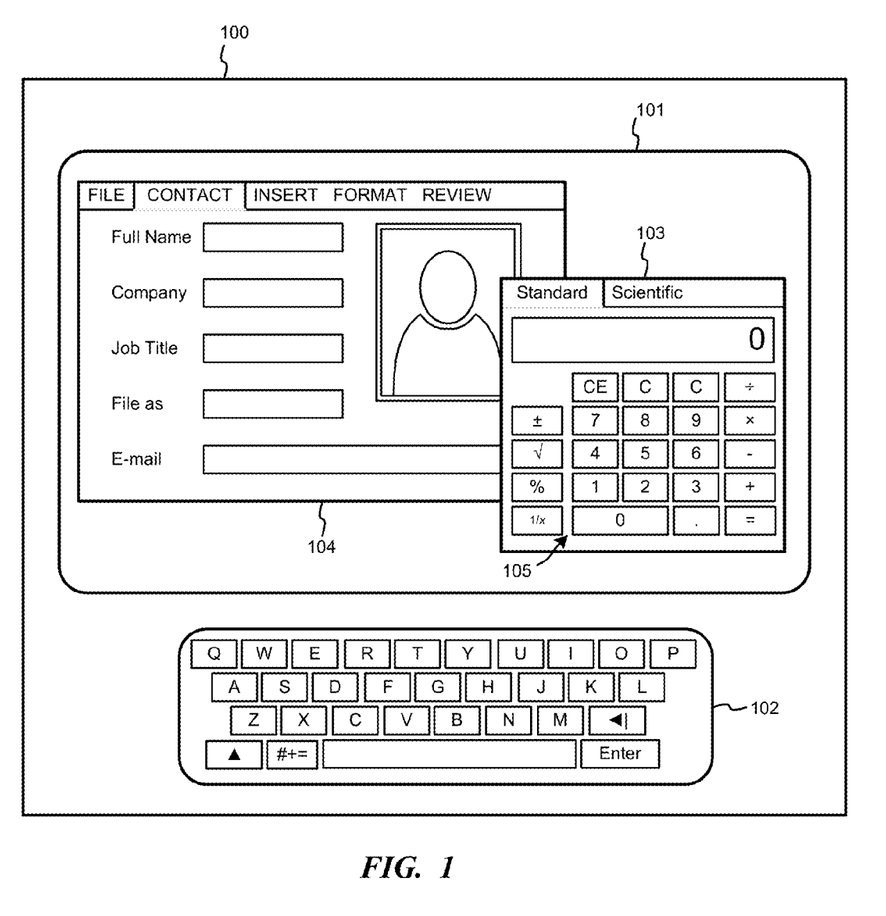
FIG. 1 illustrates a system having a display and a keyboard for implementing view activation via hit testing in an asynchronous windowing system.

FIG. 1 illustrates a system 100 having a display 101 and a keyboard 102. Windows for two applications are visible on display 101. A calculator application is active and is shown in the foreground of display 101 as window 103. A contact list application is inactive and is shown as window 104 behind the calculator application window 103. The calculator application displays a number of buttons 105 that allow users to enter numbers, select mathematical operations, or provide other inputs to the calculator application. Additionally, when the calculator application is active, a user may enter numbers or operations via keyboard 102 instead of using the buttons 105 on display 101. The contact list application also displays a number of input fields in window 104 that would allow the user to enter text data when the contact list application is active.

When the calculator application is the currently selected application and displayed as the foreground window 103, all inputs from keyboard 102 are provided to the calculator application. Since the contact list application is not currently selected, it is displayed as background window 102. It will be understood that any number of additional applications may also be running on device 100. These additional applications may be shown in additional background windows on display 101 and do not receive keyboard input from the user when not the currently selected application.

The user may touch window 104 to select the contact list application and make it the currently selected application. As used herein, the term "touch" will be understood to mean any touch by a user's finger or other object on a display and includes selections by a pointing device, such as a mouse or touchpad. When the user has selected the contact list application, the contact list window 104 is drawn on display 101 as the foreground application and calculator window 103 is moved to the background or minimized Device 100 sends all future input from keyboard 102 to the contact list application until it is closed or another application is picked as the currently selected application.

While the device 100 is in the process of changing to a new currently selected application, the inputs to keyboard 102 must be directed to the correct application. As such, device 100 must determine if keyboard inputs detected after a new application is touched or clicked are intended for the old currently selected application (e.g., the calculator application) or the new currently selected application (e.g., the contact list application). In prior devices having operating systems with a monolithic, synchronous windows manager, the user pointer input can be easily correlated with a target window so that keyboard inputs are routed to the associated application since the synchronous windows manager receives all input and knows about all windows drawn on display 101. The use of a single, monolithic component can create a performance bottleneck because all system operations must pass through that component thereby resulting in operational delays. In an asynchronous distributed operating system, such delays can be minimized because system components are able to operate independently. However, in a distributed asynchronous system, a new process for managing currently selected applications and keyboard inputs must be used to ensure keyboard inputs are directed to the correct application.

Applications may be visible (i.e., drawn on display) or not visible (i.e., not drawn on display or minimized). One of the visible applications is active and is drawn in the foreground on the display. That active application will receive any input from the keyboard. There are often many controls (e.g., keys, buttons, text boxes) shown on an application's view. One of these controls will have focus and will receive any inputs, such as keyboard inputs.

Figure 2:
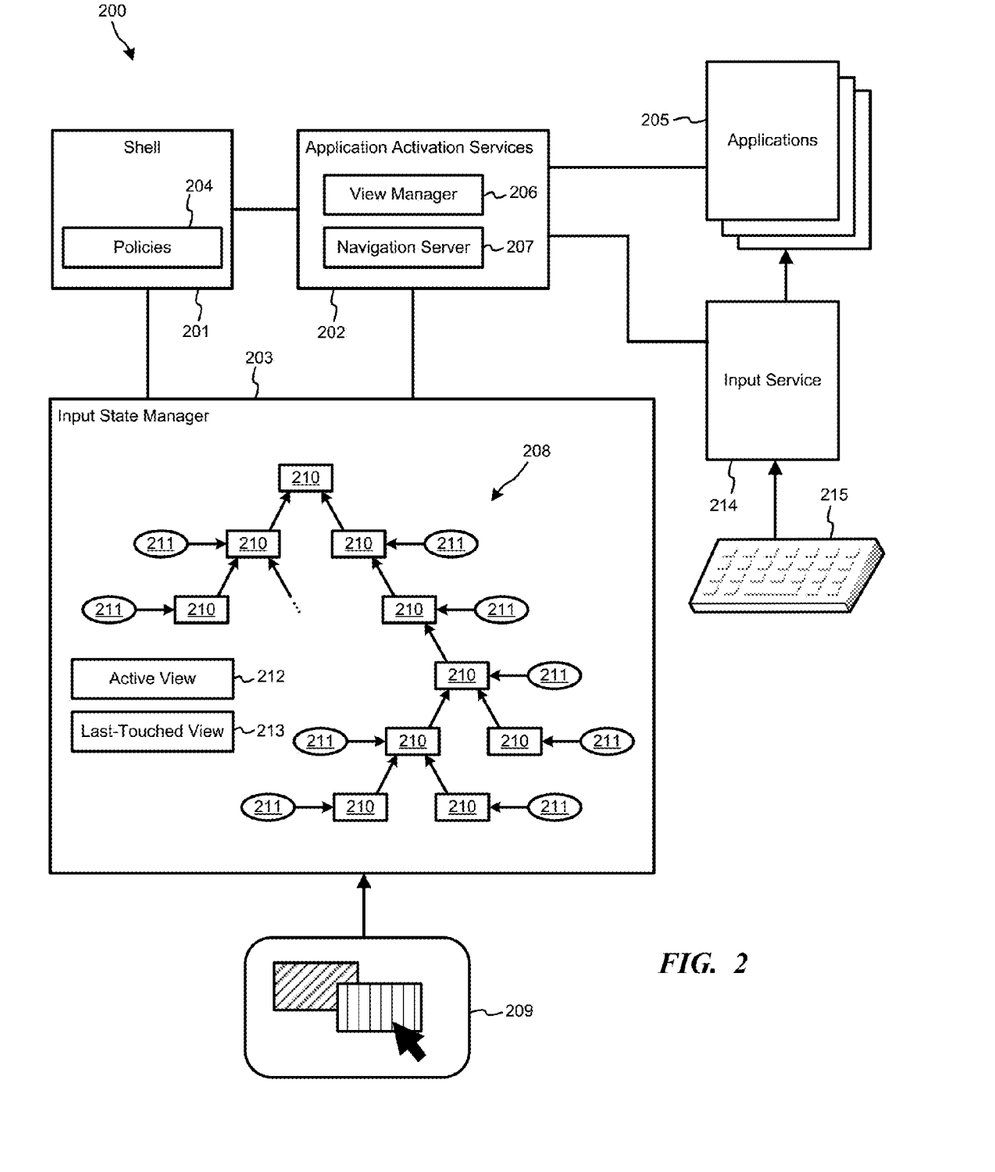
FIG. 2 is a block diagram illustrating certain components of a distributed asynchronous operating system.

FIG. 2 is a block diagram illustrating certain components of a distributed asynchronous operating system 200. This system allows a device to detect when a user has touched or clicked on an application that is visible on the display, but not the current/foreground application, and then to activate the touched/clicked application and to provide future keyboard input to that application. Shell 201 manages other components of the operating system, such as application activation services 202 and input state manager 203, and applies policies 204. Application activation services 202 is responsible for controlling applications 205 running on the device and how the applications are displayed. View manager 206 has knowledge of all views displayed and the views' current state. Navigation server 207 has knowledge of how to transition application views from one state to another and provides a uniform event sequence. For example, navigation server 207 instructs applications 205 that they are active/inactive and then listens for the applications to confirm that they are active/inactive. In one embodiment, application activation services 202 may be a component of view management software in shell 201.

Input state manager 203 uses a visual tree 208 for hit testing to determine where the user has touched or clicked on display 209. Visual tree 208 comprises a number of spatial nodes 210 wherein each node 210 represents a specific portion of the display. Child nodes correspond to subportions of the display area represented by their respective parent nodes. When a user touch is detected on the display, input state manager 203 starts at the top node on visual tree 208 and walks down the tree until it arrives at the most specific node associated with the user-selected display area. The input state manager 203 then sends input to the input sink 211 associated with the portion of the display that was touched or clicked. Input state manager 203 also tracks the active view 212 on the display and the last-touched view 213.

Input service 214 receives input, such as keystrokes, button-presses, etc., from keyboard 215. Input service 214 manages where such keyboard 215 input should be sent, such as to the currently selected or active application 205. Input services 214 may provide additional text editing services such as auto-complete, text correction, spell checking, and the like. Input service 214 may further interact with editing controls of the active application to modify the input from keyboard 215.

The components of distributed asynchronous operating system 200 communicate using messaging. This allows the components to operate independently without one component acting as a bottleneck potentially blocking operation of the device. However, in such an asynchronous system, one component does not know when another component receives messages or when the other component acts on messages. Accordingly, unlike prior monolithic synchronous systems, distributed asynchronous system components must provide additional information to ensure the components are working together to change application views and inputs.

Figure 3:
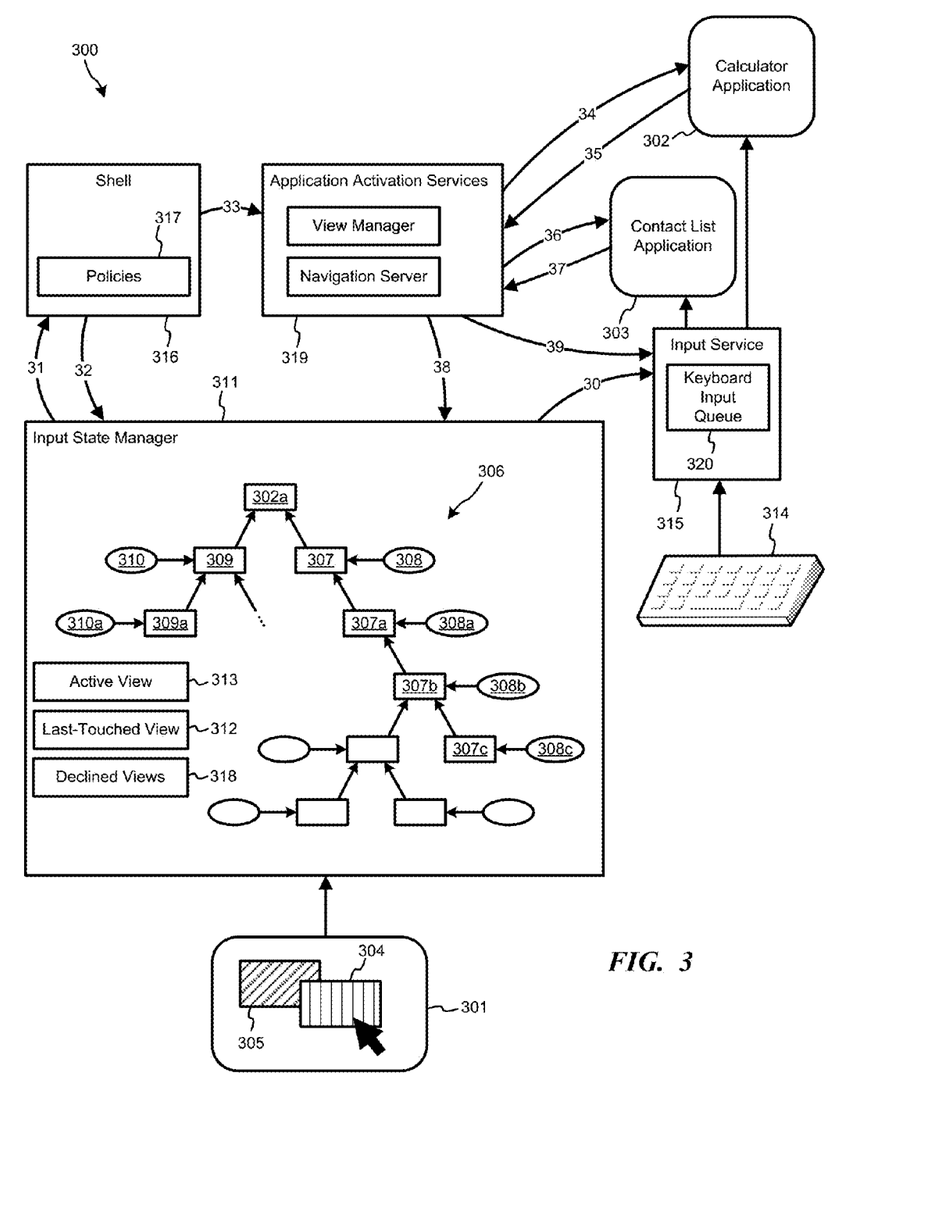
FIG. 3 is a block diagram illustrating the interaction of components in a distributed asynchronous system to activate applications based on detecting touches on a display.

FIG. 3 is a block diagram illustrating the interaction of components in a distributed asynchronous system 300 to activate applications based on detecting touches on a display 301. Two applications are running on the example system— calculator application 302 and contact list application 303. Corresponding views are created on display 301, where view 304 corresponds to calculator application 302 and view 305 corresponds to contact list application 303. In the present example, calculator application 302 is the currently selected application and is shown in the foreground as view 304 on display 301. View 305 for contact list application 303 is shown in the background since it is not the currently selected application.

Visual tree 306 includes top-level nodes associated with calculator application 302 (node 307) and contact list application 303 (node 309). As applications 302, 303 and views 304, 305 are created and made visible on display 301, the respective input sinks 308, 310 of the applications' top-level visuals are annotated with an identifier that uniquely identifies the view 304, 305 in the current session. The view information can be stored on any portion of the visual tree 304 used for hit testing.

When hit testing is performed by input state manager 311, a bottom-to-top list of input sinks encountered during the hit testing process is returned. For example, when the user touches a key displayed on view 304 for calculator application 302 (e.g., a mathematical operation key), hit testing may detect that node 307*c* corresponds to the smallest area of the display around the point of the user's touch. This identifies the particular area of the display that has been selected by the user. Input sink 308*c* identifies where the corresponding touch data should be provided as input. For example, touches on a mathematical operation key displayed on view 304 may be sent to calculator application 302.

Input state manager 311 also identifies sink input 308 for the top-level view 307 associated with that touch. The search for the top-level view can be performed simultaneously within the hit testing search or as a separate search. This information is stored as last-touch view 312 for each click, pen tap, or touch that is detected.

In the present example, the currently selected application is calculator application 302, and the active view 313 stores the top-level view 307 for the calculator application. As long as the calculator application 302 is the currently selected application, any input received from keyboard 314 at input service 315 is passed to calculator application 302.

If the user wants to use contact list application 303 and touches view 305 on display 301, then input state manager 311 will perform hit testing to detect the input sink 310*a* corresponding to the area touched 309*a*. Additionally, input state manager 311 will identify the top-level view 309 for this touch, which will be stored to last-touch view 312. Upon detection that the new hit test view (i.e., 309) is not the active view and not the last hit test view (i.e. 307), then input state manager 311 will send a notification message 31 to the shell 316. The input state manager 311 stores the currently active view 313 and the last-touched view 312 in order to limit notifications 31 so that the notifications occur only for hit-test events that are of interest, such as when the view for a different application has been touched. This minimizes the number of interactions between input state manager 311 and shell 316 to events that might require a change in the active application view.

In alternative embodiments, input state manager 311 could send a notification message for every touch that is detected without regard to which application is currently active and which application was touched.

Shell 316 receives notification message 31 and applies policies 317 to determine what action to take. Shell 316 responds with message 32 to inform input state manager 311 whether the application corresponding to the last-touched view will be activated or if the activation will be declined. For example, if notification message 31 indicates that last-touch view 312 is contact list application 303 and the active view 313 is calculator application 302, then shell 316 may determine that contact list application 303 should be activated. Shell 316 will notify input state manager 311 of this activation in response message 32. In other situations, policies 317 may cause shell 316 to decline activation for certain last-touched views, such as special views for software keyboards, virtual mouse controllers, system messages, and the like.

Embodiments of the system are designed to save power and reduce noise by avoiding repeated notification messages 31 that are associated with the currently active view 313. If hit testing indicates that the top-level view that was last touched is the active view, then there is no need to notify shell 316 of a possible view change. Additional embodiments may provide further optimizations to reduce repeated notification messages 31 that are associated with hit-test views whose activation has been declined by shell 317. For example, if input state manager 311 determines that the last-touched view is associated with a software keyboard but the active view is calculator application 302, then input state manager 311 will send a notification message 31 to shell 316. As noted above, policy 317 may prevent the active view from changing away from the calculator application to the software keyboard. As such, shell 316 will decline the view change in response message 32.

Input state manager 311 may continue to send notification messages every time the last-touched view 312 is different from the active view 313 without regard to previous declines. In another embodiment, when a view change for a particular view has been declined by shell 316, input state manager 311 may use that denial to determine whether future notification messages 31. Input state manager 311 may track declined views 318 and use that information to evaluate whether to send a notification message 31 for a previously declined view. Input state manager 311 may employ any number of options for processing the declined views. For example, input state manager 311 may stop future notification messages for a declined view either for all time or for a predetermined period of time. The length of the predetermined period of time may be a set duration for all views or may be set on a view- or application-specific basis. In other embodiments, input state manager 311 does not stop or reduce notification messages for a particular view until it has been declined two or more times by shell 316.

When shell 316 determines that the view should be changed, it notifies application activation services 319 by sending view state change message 33. Application activation services 319 handles activation of the new application (e.g., contact list application 303) and deactivation of the old application (e.g., calculator application 302). Application activation services 319 sends deactivation message 34 to calculator application 302, which responds to with deactivation acknowledgement message 35. Application activation services 319 sends activation message 36 to contact list application 303, which responds to with activation acknowledgement message 37.

Once application activation services 319 has confirmed that contact list application 303 has acknowledged that it is now the active application, the activate application is identified to input state manager 311 and input services 315 in messages 38 and 39, respectively. Alternatively, application activation services 319 may publish or post the identity of the current application, and input state manager 311 and input services 315 may listen for updates to the current application status.

Keyboard input that arrives at input service 315 after a touch is detected on a new view by input state manager 311 should be routed to the new active application. However, due to the distributed nature of system 300, there is a risk that keyboard input will flow to the prior (i.e., incorrect) application before shell 316 has made a policy decision to activate the new application. Accordingly, system 300 must coordinate changes between the active view, active application, and the keyboard input.

In one embodiment, when a view hit-test notification 31 is going to be sent to shell 316 (i.e., when last-touched view 312 does not match active view 313), input state manager 311 also sends notification message 30 to input service 315, which indicates that a possible change in active application may occur. Upon receipt of notification message 30, input service 315 suspends keyboard input delivery to the applications and stores subsequent key strokes in a queue 320. If the shell declines to activate the new view, then keyboard input is resumed and input service 315 delivers all queued keyboard input to the application associated with the previously active view. Input service 315 may be notified by shell 316, input state manager 311, or application activation services 319 when such a view change is declined. Although, a keyboard is used as the source of input to an application in the examples herein, it will be understood that applications may receive inputs from other sources, such as pointing devices, touch screens, touch pads, game controllers, multiple-degree of freedom devices, imaging devices, microphones, cameras, and any other embedded or peripheral device.

Alternatively, if the shell decides that a new application should be activated, input service 315 continues to queue keyboard input until the activation of the new view is completed. Then, the queued keyboard input is delivered to the newly activated view. Activation of a view may take significant time compared to the time between clicks/touches and keystrokes because the view may require significant processing in response to the activation events. Input service 315 may be notified by shell 316, input state manager 311, or application activation services 319 when such a view change is completed.

To prevent blocking, input service 315 may limit the duration of its wait for activation or denial of a new view or change of application. Input service 315 may queue keyboard input for a predetermined waiting period or until a predetermined amount of data is stored to keyboard input queue 320. Once the predetermined waiting period has elapsed or the predetermined amount of data has been stored, input service 315 may assume that the view change was denied and then provide all queued keyboard input to the previous application.

The touch that initiates the hit testing or any other touch that occurs while keyboard input is being queued may land on an edit control. If the edit control is in the view that is in the process of being activated, then that edit control will receive focus once the view activation is completed.

Figure 4:
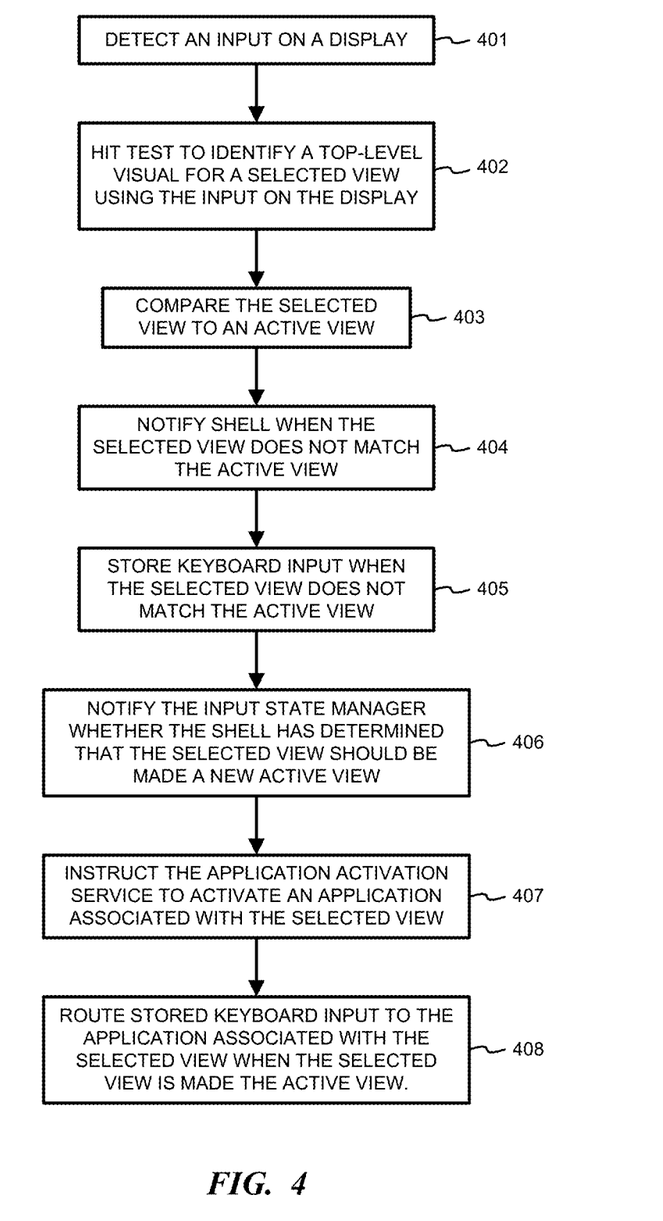
FIG. 4 is a flowchart illustrating a method for activating views on a display according to an example embodiment.

FIG. 4 is a flowchart illustrating a method for activating views on a display according to an example embodiment. In step 401, an input is detected on a display. The input on the display may be from a human touch or a pointing device, for example. In step 402, hit testing is performed on a visual tree to identify a top-level visual for a selected view. The hit testing is performed using the input on the display. Hit testing may be performed by an input state manager, for example.

In step 403, the selected view is compared to an active view. In step 404, the shell is notified when the selected view does not match the active view. In step 405, keyboard input is stored when the selected view does not match the active view.

In step 406, the input state manager is notified whether or not the shell has determined that the selected view should be made a new active view. In step 407, an application activation service is instructed to activate an application associated with the selected view. In step 408, stored keyboard input is routed to the application associated with the selected view when the selected view has been made an active view.

It will be understood that steps 401-408 of the process illustrated in FIG. 4 may be executed simultaneously and/or sequentially. It will be further understood that each step may be performed in any order and may be performed once or repetitiously.

Figure 5:
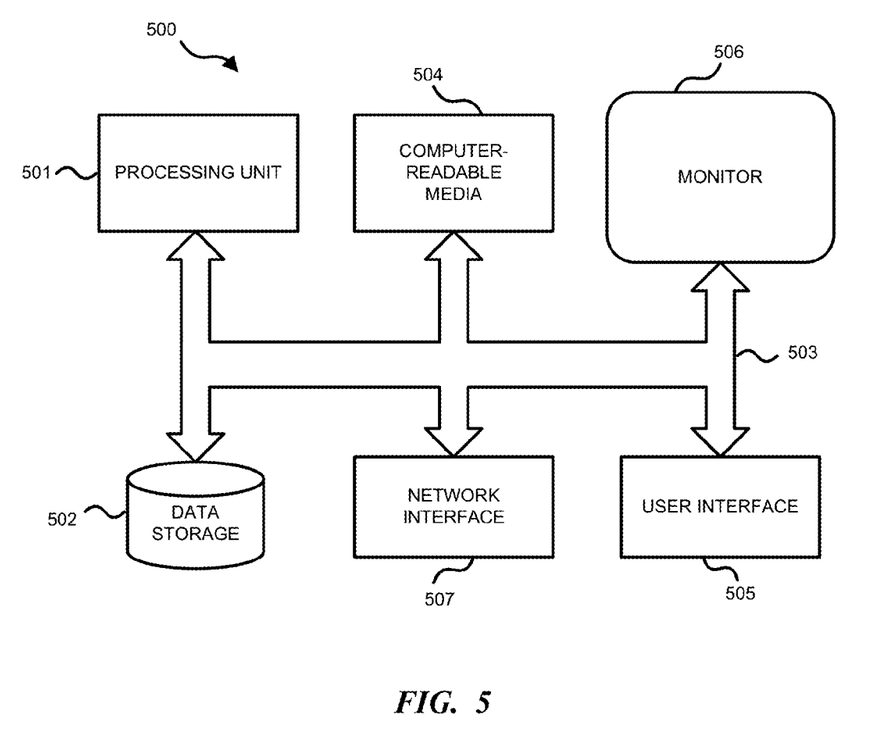
FIG. 5 illustrates an example of a suitable computing and networking environment on which example embodiments may be implemented.

FIG. 5 illustrates an example of a suitable computing and networking environment 500 on which the examples of FIGS. 1-4 may be implemented. The computing system environment 500 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 500. Components may include, but are not limited to, various hardware components, such as processing unit 501, data storage 502, such as a system memory, and system bus 503 that couples various system components including the data storage 502 to the processing unit 501. The system bus 503 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 500 typically includes a variety of computer-readable media 504. Computer-readable media 504 may be any available media that can be accessed by the computer 500 and includes both volatile and nonvolatile media, and removable and non-removable media, but excludes propagated signals. By way of example, and not limitation, computer-readable media 504 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 500. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 502 includes computer storage media in the form of volatile and/or nonvolatile memory such as read only memory (ROM) and random access memory (RAM). A basic input/output system (BIOS), containing the basic routines that help to transfer information between elements within computer 500, such as during start-up, is typically stored in ROM. RAM typically contains data and/or program modules that are immediately accessible to and/or presently being operated on by processing unit 501. By way of example, and not limitation, data storage 502 holds an operating system, application programs, and other program modules and program data.

Data storage 502 may also include other removable/non-removable, volatile/nonvolatile computer storage media. By way of example only, data storage 502 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 5, provide storage of computer-readable instructions, data structures, program modules and other data for the computer 500.

A user may enter commands and information through a user interface 505 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 501 through a user input interface 505 that is coupled to the system bus 503, but may be connected by other interface and bus structures, such as a parallel port, game port or a universal serial bus (USB). A monitor 506 or other type of display device is also connected to the system bus 503 via an interface, such as a video interface. The monitor 506 may also be integrated with a touch-screen panel or the like. Note that the monitor and/or touch screen panel can be physically coupled to a housing in which the computing device 500 is incorporated, such as in a tablet-type personal computer. In addition, computers such as the computing device 500 may also include other peripheral output devices such as speakers and printer, which may be connected through an output peripheral interface or the like.

The computer 500 may operate in a networked or cloud-computing environment using logical connections 507 to one or more remote devices, such as a remote computer. The remote computer may be a personal computer, a server, a router, a network PC, a peer device or other common network node, and typically includes many or all of the elements described above relative to the computer 500. The logical connections depicted in FIG. 5 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 500 may be connected to a public or private network through a network interface or adapter 507. In some embodiments, a modem or other means for establishing communications over the network. The modem, which may be internal or external, may be connected to the system bus 503 via the network interface 507 or other appropriate mechanism. A wireless networking component such as comprising an interface and antenna may be coupled through a suitable device such as an access point or peer computer to a network. In a networked environment, program modules depicted relative to the computer 500, or portions thereof, may be stored in the remote memory storage device. It may be appreciated that the network connections shown are exemplary and other means of establishing a communications link between the computers may be used.

Devices with asynchronous windowing systems may allow multiple application windows to be displayed to a user, wherein one window is active and its associated application receives input from the keyboard or other sources. The user may switch between applications and displayed windows are changed from inactive to active when an application is selected. A shell may provide user access to the operating system's services via the windows on the display. Keyboard or other input may be queued, buffered, stored, or otherwise held between the time an inactive application view is selected and the time when a new view is activated or a currently active view is maintained. Advantageously, the device quickly determines when the active view is changed and directs the keyboard or other input to the appropriate application that is associated with the active view to reduce errors associated with misdirected input and to improve user interaction with the device.

An example system comprises a display, a processor, and system memory storing computer-executable instructions. When executed by the processor, the computer-executable instructions cause the processor to detect an input on a display, execute a hit-test on a visual tree in an input state manager to identify a selected view using the input on the display, compare the selected view to an active view, notify a shell when the selected view does not match the active view, and notify the input state manager whether or not the shell has determined the selected view should be made a new active view.

The computer-executable instructions may further cause the processor to instruct an application activation service to activate an application associated with the selected view, and notify an input manager when the application associated with the selected view has been made an active view. The computer-executable instructions may further cause the processor to store keyboard input when the selected view does not match the active view, and route stored keyboard input to the application associated with the selected view when the selected view has been made an active view. The input on the display may be from a human touch or a pointing device. The shell may apply view policies to determine when the selected view should be made a new active view. The computer-executable instructions further cause the processor to determine when the shell has declined to set the selected view as the new active view, and determine whether to notify the shell when a subsequent selection of the selected view does not match the active view.

An example method for activating views on a display comprises detecting an input on the display, hit testing on a visual tree in a input state manager to identify a top-level visual for a selected view using the input on the display, comparing the selected view to an active view, notifying a shell when the selected view does not match the active view, and notifying the input state manager whether or not the shell has determined that the selected view should be made a new active view.

The method may further comprise instructing an application activation service to activate an application associated with the selected view, and notifying an input state manager when the application associated with the selected view has been made an active view. The method may further comprise storing keyboard input when the selected view does not match the active view, and routing stored keyboard input to the application associated with the selected view when the selected view has been made an active view. The input on the display may be from a human touch or a pointing device. The shell may apply view policies to determine when the selected view should be made a new active view. The may further comprise determining when the shell has declined to set the selected view as the new active view, and evaluating whether to notify the shell when a subsequent selection of the selected view does not match the active view.

An additional example method may comprise displaying an active application view and at least one inactive application view on a display, hit-testing a touch on the display to identify a selected application, notifying a shell when the selected application is not the active application, and queuing keyboard input when the selected application is not the active application.

The method may further comprise providing the queued keyboard input to the selected application after receiving notification that activation of the selected application is complete. The method may further comprise providing the queued keyboard input to a previously active application after receiving notification that activation of the selected application is declined. The method may further comprise evaluating, by the shell, whether to make the selected application a new active application. The method may further comprise receiving a notification, from the shell, that the selected application is being made a new active application, and comparing applications identified in subsequent hit testing to the new active application. The method may further comprise receiving a notification, from the shell, that the selected application is not being made a new active application, and storing the selected application to a list of declined applications. The method may further comprise hit-testing a second touch on the display to identify a second selected application, determining that the second selected application is not the active application, and determining whether to notify the shell when the second selected application is not the active application based upon the list of declined applications.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system, comprising:
    a display;
    a processor; and
    system memory having stored thereon computer-executable instructions that, when executed by the processor, cause the processor to:
        detect an input on a display;
        execute a hit-test on a visual tree, by an input state manager, to identify a selected view using the input on the display;
        compare the selected view to an active view;
        notify a shell when the selected view does not match the active view; and
        notify the input state manager whether or not the shell has determined the selected view should be made a new active view.

2. The system of claim 1, wherein the computer-executable instructions further cause the processor to:
    instruct an application activation service to activate an application associated with the selected view; and notify an input manager when the application associated with the selected view has been made an active view.

3. The system of claim 1, wherein the computer-executable instructions further cause the processor to:
store keyboard input when the selected view does not match the active view; and
route stored keyboard input to the application associated with the selected view when the selected view has been made an active view.

4. The system of claim 1, wherein the input on the display is from a human touch or a pointing device.

5. The system of claim 1, wherein the shell applies view policies to determine when the selected view should be made a new active view.

6. The system of claim 1, wherein the computer-executable instructions further cause the processor to:
determine when the shell has declined to set the selected view as the new active view; and
determine whether to notify the shell when a subsequent selection of the selected view does not match the active view.

7. A method for activating views on a display, comprising:
detecting an input on the display;
hit testing on a visual tree, by a input state manager, to identify a top-level visual for a selected view using the input on the display;
comparing the selected view to an active view;
notifying a shell when the selected view does not match the active view; and
notifying the input state manager whether or not the shell has determined that the selected view should be made a new active view.

8. The method of claim 7, further comprising:
instructing an application activation service to activate an application associated with the selected view; and
notifying an input state manager when the application associated with the selected view has been made an active view.

9. The method of claim 7, further comprising:
storing keyboard input when the selected view does not match the active view; and
routing stored keyboard input to the application associated with the selected view when the selected view has been made an active view.

10. The method of claim 7, wherein the input on the display is from a human touch or a pointing device.

11. The method of claim 7, wherein the shell applies view policies to determine when the selected view should be made a new active view.

12. The method of claim 7, further comprising:
determining when the shell has declined to set the selected view as the new active view; and
evaluating whether to notify the shell when a subsequent selection of the selected view does not match the active view.

13. A method comprising:
displaying an active application view and at least one inactive application view on a display;
hit-testing a touch on the display to identify a selected application;
notifying a shell when the selected application is not the active application; and
queuing keyboard input when the selected application is not the active application.

14. The method of claim 13, further comprising:
providing the queued keyboard input to the selected application after receiving notification that activation of the selected application is complete.

15. The method of claim 13, further comprising:
providing the queued keyboard input to a previously active application after receiving notification that activation of the selected application is declined.

16. The method of claim 13, further comprising:
evaluating, by the shell, whether to make the selected application a new active application.

17. The method of claim 13, further comprising:
receiving a notification, from the shell, that the selected application is being made a new active application; and
comparing applications identified in subsequent hit testing to the new active application.

18. The method of claim 13, further comprising:
receiving a notification, from the shell, that the selected application is not being made a new active application; and
storing the selected application to a list of declined applications.

19. The method of claim 18, further comprising:
hit-testing a second touch on the display to identify a second selected application;
determining that the second selected application is not the active application; and
determining whether to notify the shell when the second selected application is not the active application based upon the list of declined applications.

* * * * *